United States Patent
Harden

(10) Patent No.: US 9,688,162 B2
(45) Date of Patent: Jun. 27, 2017

(54) MODULAR SEAT CONTROL SWITCH SYSTEM

(75) Inventor: Matthew J. Harden, Powell, OH (US)

(73) Assignee: Honda Motor Co., Ltd., Tokyo (JP)

( * ) Notice: Subject to any disclaimer, the term of this patent is extended or adjusted under 35 U.S.C. 154(b) by 2312 days.

(21) Appl. No.: 12/556,112

(22) Filed: Sep. 9, 2009

(65) Prior Publication Data

US 2011/0060506 A1 Mar. 10, 2011

(51) Int. Cl.
| | |
|---|---|
| B60R 22/00 | (2006.01) |
| E05F 15/00 | (2015.01) |
| G05D 1/00 | (2006.01) |
| G05D 3/00 | (2006.01) |
| G06F 7/00 | (2006.01) |
| B60N 2/02 | (2006.01) |

(52) U.S. Cl.
CPC .................................. B60N 2/0228 (2013.01)

(58) Field of Classification Search
USPC ............................................................ 701/49
See application file for complete search history.

(56) References Cited

U.S. PATENT DOCUMENTS

| | | | |
|---|---|---|---|
| 4,888,535 A | 12/1989 | Brusasco | |
| 5,802,389 A * | 9/1998 | McNutt ................. | G05B 19/054 710/1 |
| 5,894,207 A * | 4/1999 | Goings .................. | B60N 2/002 318/478 |
| 6,249,913 B1 * | 6/2001 | Galipeau ............ | H04N 7/17318 348/E5.002 |
| 6,373,299 B1 | 4/2002 | Strecker | |
| 6,384,715 B1 | 5/2002 | Potter | |
| 6,578,916 B2 | 6/2003 | Longhi et al. | |
| 6,590,354 B2 | 7/2003 | Hein | |
| 6,720,671 B2 * | 4/2004 | Kondo ................... | B60N 2/002 174/72 A |
| 7,188,894 B2 | 3/2007 | Humer et al. | |
| 7,239,096 B2 | 7/2007 | Hancock et al. | |
| 7,346,436 B2 | 3/2008 | Altmann et al. | |
| 7,803,016 B2 * | 9/2010 | Neu ........................ | H04R 5/00 439/527 |
| 2002/0050730 A1 | 5/2002 | Kondo et al. | |
| 2002/0176223 A1 * | 11/2002 | Shiozaki ............... | G06F 1/1632 361/636 |
| 2003/0098661 A1 * | 5/2003 | Stewart-Smith ..... | B60N 2/0244 318/445 |
| 2004/0183346 A1 | 9/2004 | Sanford et al. | |
| 2008/0185888 A1 | 8/2008 | Beall et al. | |
| 2009/0039987 A1 | 2/2009 | Mattlar et al. | |

* cited by examiner

Primary Examiner — Imran Mustafa
(74) Attorney, Agent, or Firm — Honda Patents & Technologies North America, LLC; Clifford B Vaterlaus

(57) ABSTRACT

Some embodiments relate to a modular vehicle seat control system including a plurality of control units direct mounted to one or more other control system units through a bus system. The modular construction obviates the need for additional wiring, and enables a manufacturer to install one or more of the control units in any suitable arrangement by engaging the control units through rigidly mounted bus connectors. Suitable control units can comprise manually actuated components for controlling any of a wide variety of vehicle seat functions.

20 Claims, 2 Drawing Sheets

MODULAR SEAT CONTROL SWITCH SYSTEM

I. BACKGROUND

A. Field of Invention

This invention generally relates to electronic vehicle seat control systems.

B. Description of the Related Art

It is known in the automotive arts to incorporate electronic devices into vehicle seats for adjusting characteristics such as tilt, recline, and other comfort-related variables. Those skilled in the art also recognize the need for simplifying manufacturing processes, thereby limiting errors and improving manufacturing efficiency. Prior attempts to simplify vehicle seat wiring have included using various wiring harnesses to organize the wiring into a subsystem that can be pre-made and then installed by a line worker. While this may increase efficiency at the assembly line, this still requires complex wiring procedures often performed by human workers rather than automation. Other attempts having included prepositioning a wiring harness within the seat assembly including bus connectors located at predetermined locations where a component is to be installed. This too requires complex external wiring, and pre-installation of the wiring harness in addition to installation of the electronic members two which it will be later attached.

In non-vehicle seat arts, connections have been made using separate structures for making electrical contacts between components, and for mechanically holding the components together as a unit. This approach has the drawback of requiring two separate structures to perform a task that could be carried out with a single structure. Thus, the manufacturing process is less efficient.

What is needed is a modular vehicle seat electronic control system where the modules can be directly mounted to each other without additional wiring. wherein a single structure simultaneously makes electrical contact and mechanically holds components of the system together. Some embodiments of the present invention may overcome one or more shortcomings of the prior art.

II. SUMMARY

Some embodiments relate to a modular electronic automobile seat controller, comprising: a main control module adapted to fixedly mount to a vehicle seat, the main control module comprising at least one control face having at least one manually actuated electronic seat control; and at least one bus member defined in a face of the main control module other than the control face, the at least one bus member being adapted to engage a complimentary bus member in a direct mounting relation, wherein the complimentary bus member can be operatively disposed on an optional expansion module and electronically communicating therewith, or operatively disposed on the vehicle seat and electronically communicating with an external processor.

Some embodiments relate to a modular bus for an electronic vehicle seat control system, comprising: a male bus member operably disposed on a side of a first electronic seat control module and in electrical communication with at least one electronic component in the first seat control module, the male bus member defining an outer perimeter, and the male bus member comprising at least one electrical conductor; and a female bus member operably disposed on a side of a second electronic seat control module and in electrical communication with at least one electronic component in the second seat control module, the female bus member defining an inner perimeter adapted to receive the male bus member in a mating relation, wherein the first electronic seat control module and the second electronic seat control module are joined in a direct mounted relation, the female bus member further comprising at least one electrical conductor adapted to mate with the corresponding at least one electrical conductor of the male bus member.

Other benefits and advantages will become apparent to those skilled in the art to which it pertains upon reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

IV. DETAILED DESCRIPTION

Figure 1:
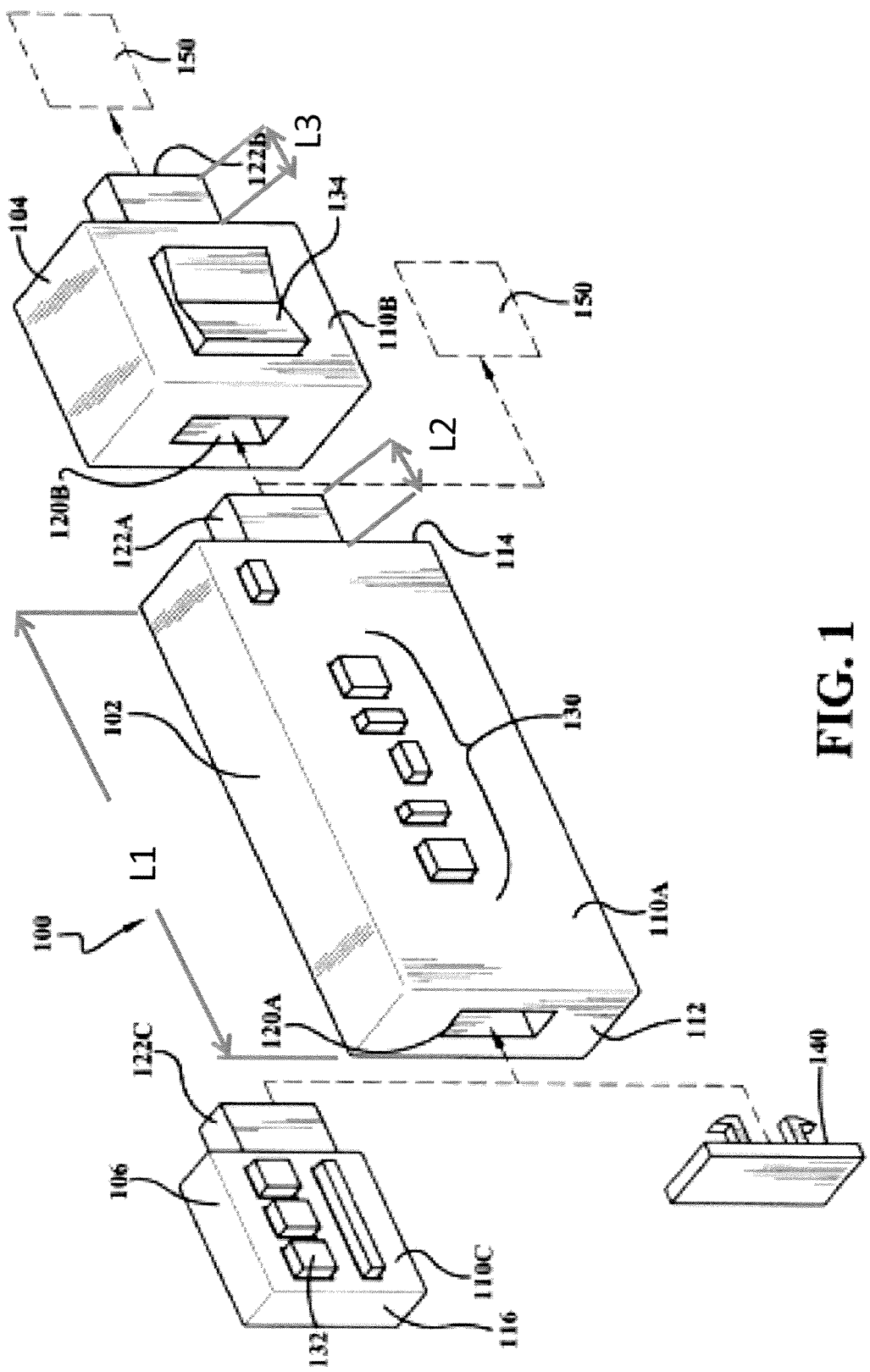
FIG. 1 is an exploded view drawing of a modular seat control system according to one embodiment.

Some embodiments comprise a modular seat control system. The system can include a main control module that can electrically communicate with an external circuit and/or with other control modules. As used herein the term external circuit includes all electronic components that do not comprise the modular seat control system, but that are in electronic circuit communication with the modular seat control system. According to some embodiments, the main control module includes one or more manually actuated seat controls. Other control modules can be optional devices for expanding the functionality of the modular seat control system. Accordingly, such devices are referred to herein as optional expansion modules, and can include manually actuated seat controls for controlling any of a wide variety of seat functions such as, without limitation, tilt, fore and aft translation, recline, lumbar support, or seat temperature; or for providing memory or digital processor means.

According to some embodiments the main control module is adapted to direct mount to one or more optional expansion modules, or to an external circuit. As used herein the term direct mount includes bus connections wherein a male bus member is operatively and rigidly disposed on an outer surface of a first control module, and a female bus member is operatively and rigidly disposed on an outer surface of a second control member, and the male and female bus members engage in a mating relation while holding the first and second control modules in a substantially rigid relation with respect to each other. Furthermore, according to some embodiments a main control module can simultaneously direct mount to at least one expansion module and to an external circuit.

In some embodiments the external circuit can include components such as, without limitation, one or more electric motors for adjusting vehicle seat characteristics such as tilt, fore and aft translation, recline, or lumbar support. Other suitable external circuit components can include, without limitation, devices for regulating seat temperature, such as temperature sensors, heating elements and/or cooling elements. Still other suitable external circuit components can include, without limitation, a digital processor and/or digital memory. For instance, the digital processor can comprise a central digital processor controlling various automobile functions. Alternatively, a suitable processor can include a dedicated digital processor specifically adapted to control the modular seat control system.

According to some embodiments a bus can comprise one or more of a data bus line or a power supply bus line. Furthermore, some embodiments can comprise a plurality of data bus lines or power supply lines. One of skill in the art will appreciate that a power supply line is adapted to supply electric power to various system components, and that data bus lines are adapted to carry electronic control and/or monitoring signals from one system component to another. Some embodiments can comprise any type of data bus line, connection, and/or protocol chosen by one of skill in the art. Some embodiments can comprise any type of power supply bus line, connection, and/or protocol chosen by one of skill in the art. Any number or arrangement of bus lines can be appropriate. For example, in some embodiments, a male bus member can comprise conductive material defining an outer perimeter, wherein the outer perimeter comprises a generally rectangular parallelepiped or other suitable shape. According to such embodiments, the conductive material can comprise a bus line, or a plurality of bus lines. In other embodiments, an outer perimeter can surround one or more pins comprising bus line terminals. In such embodiments, the outer perimeter can also comprise a bus line terminal and/or it can comprise one or more of a guide for locating the pins in a female bus member, an electromagnetic shield, and/or a ground.

One of skill in the art will recognize that any of a wide variety of communication architectures and/or protocols can be appropriate. Suitable bus architectures can include, without limitation, known architectures such as one or more of a serial bus, parallel bus, a High Performance Parallel Interface Bus, an IEEE-488 bus, a Small Computer System Interface Bus, a Serial Attached Small Computer Interface Bus, an RS-232 bus, a Universal Serial Bus, and/or an IEEE-1394 bus. Furthermore, one of skill in the art will recognize that appropriate bus architectures can be arranged in daisy chain, hub, network and/or any other suitable configuration.

Referring now to the drawings wherein the showings are for purposes of illustrating embodiments of the invention only and not for purposes of limiting the same, and wherein like reference numerals are understood to refer to like components, FIG. 1 is an exploded view of a modular seat control system 100 according to one embodiment. The system 100 comprises a main control module 102, a first expansion module 104, and a second expansion module 106. As used herein the terms first and second expansion module do not indicate an order, but rather is only intended to distinguish between distinct elements of the system. The main control module 102 has a length L1 and includes a male bus member 122A having a length L2 operatively disposed on a face 114 of the main control module 102, and a female bus member 120A operatively disposed on an opposing face 112 of the main control module 102. The main control module 102 further comprises a control face 110A including a bay of manually actuated electronic seat controls 130 comprising switches. The main control module 102 receives the first expansion module 104 in a direct mounting relation through mating the male bus member 122A with a female bus member 120B. Alternatively, the main control module 102 could connect to an external circuit 150 rather than to the first expansion module 104.

The first expansion module 104 further comprises a male bus member 122B having a length L3 disposed on a face opposing that of the female bus member 120B. The first expansion module 104 also includes a control face 110B having a manually actuated electronic seat control 134. According to this embodiment, the electronic seat control 134 is a switch adapted to control a lumbar support system disposed within the seat assembly. Although any number of expansion modules could be daisy chained from the male bus member 122B, no further modules are shown in this embodiment 100. Therefore, the lumbar control expansion module 104 is shown connecting to an external circuit 150 instead.

The second expansion module 106 comprises a memory device including a male bus member 122C adapted to mate with the female bus member 120A in a direct mounting relation. According to this embodiment the second expansion module 106 does not include a female bus member disposed on opposing face 116. However, one of skill in the art will recognize that such a modification can be desirable in other embodiments. The second expansion module 106 further comprises a control face 110C including a plurality of manually actuated controls 132 for entering control settings into memory. Alternatively, in some embodiments the memory module could be exchanged for a different expansion module or for a cap 140, when a second expansion module is not desired.

Figure 2:
FIG. 2 is an interior view of a vehicle including a seat with the modular seat control system according to one embodiment.

With reference now to FIG. 2, a vehicle 10 may be equipped with a seat 20 including the modular seat control system 100 according to one embodiment of this invention. While the vehicle 10 shown in FIG. 1 is a sedan, it is to be understood that the modular seat control system 100 of this invention will work with any vehicle including, for some non-limiting examples, cars, vans, trucks, airplanes, and boats. The vehicle 10 may include a frame, one or more ground engaging wheels operatively mounted to the frame, a body mounted to the frame, and a locomotion source mounted to the frame for use in providing locomotion for the vehicle 10. The locomotion source could be of any type chosen with the sound judgment of a person of skill in the art including, for some non-limiting examples, an internal combustion engine, an electric motor, and a so called "hybrid" which combines an internal combustion engine with an electric motor.

The embodiments have been described, hereinabove. It will be apparent to those skilled in the art that the above methods and apparatuses may incorporate changes and modifications without departing from the general scope of this invention. It is intended to include all such modifications and alterations insofar as they come within the scope of the appended claims or the equivalents thereof.

I claim:

1. A modular electronic automobile seat controller for use with an associated vehicle seat having a vehicle seat frame, comprising:
   a main control module fixedly mountable to the vehicle seat frame, the main control module having a length L1 and comprising: a first surface; and, at least one manually actuated electronic seat control that controls a first associated electronic seat device;
   a first expansion module comprising: a first surface; and, at least one manually actuated electronic seat control that controls a second associated electronic seat device;
   a first male bus connector having a length L2, wherein L2 is less than L1;
   a first opening that defines a first female bus connector that receives the first male bus connector to form an electronic mating connection between the main control module and the first expansion module; and, wherein one of: (1) the first male bus connector extends from the first surface of the main control module and the first opening is formed in the first surface of the first expansion module; and, (2) the first male bus connector extends from the first surface of the first expansion module and the first opening is formed in the first surface of the main control module.

2. The modular electronic automobile seat controller of claim 1, wherein the first male bus connector comprises one or more of a data bus line and a power supply bus line.

3. The modular electronic automobile seat controller of claim 1, wherein the first male bus connector comprises one or more of a serial bus, parallel bus, a high performance parallel interface bus, an IEEE-488 bus, a small computer system interface bus, a serial attached small computer interface bus, an RS-232 bus, a universal serial bus, an IEEE 1394 bus.

4. The modular electronic automobile seat controller of claim 3, wherein the first male bus connector is adapted for bidirectional communication.

5. The modular electronic automobile seat controller of claim 1 wherein the main control module controls one or more of vehicle seat fore and aft motion, vehicle seat tilt, and vehicle seat height.

6. The modular electronic automobile seat controller of claim 1 wherein:
the first male bus connector extends from the first surface of the main control module and the first opening is formed in the first surface of the first expansion module.

7. The modular electronic automobile seat controller of claim 1 wherein:
the first male bus connector extends from the first surface of the first expansion module and the first opening is formed in the first surface of the main control module.

8. The modular electronic automobile seat controller of claim 1 further comprising:
a second expansion module comprising: a first surface; and, at least one manually actuated electronic seat control that controls a third associated electronic seat device;
a second male bus connector having a length L3, wherein L3 is less than L1;
a second opening that defines a second female bus connector that receives the second male bus connector to form an electronic mating connection between the main control module and the second expansion module; and,
wherein one of: (1) the second male bus connector extends from the second surface of the main control module and the second opening is formed in the first surface of the second expansion module; and, (2) the second male bus connector extends from the first surface of the second expansion module and the second opening is formed in the second surface of the main control module.

9. The modular electronic automobile seat controller of claim 8 wherein:
the second male bus connector extends from the second surface of the main control module and the second opening is formed in the first surface of the second expansion module.

10. The modular electronic automobile seat controller of claim 8 wherein:
the second male bus connector extends from the first surface of the second expansion module and the second opening is formed in the second surface of the main control module.

11. A modular electronic automobile seat controller assembly. comprising:
an automobile seat having a vehicle seat frame;
a first electronic seat device:
a second electronic seat device;
a modular electronic automobile seat controller comprising:
a main control module fixedly mounted to the vehicle seat frame, the main control module having a length L1 and comprising: a first surface; and, at least one manually actuated electronic seat control that controls the first electronic seat device;
a first expansion module comprising: a first surface; and, at least one manually actuated electronic seat control that controls the second electronic seat device;
a first male bus connector having a length L2, wherein L2 is less than L1;
a first opening that defines a first female bus connector that receives the first male bus connector to form an electronic mating connection between the main control module and the first expansion module; and,
wherein one of: (1) the first male bus connector extends from the first surface of the main control module and the first opening is formed in the first surface of the first expansion module; and, (2) the first male bus connector extends from the first surface of the first expansion module and the first opening is formed in the first surface of the main control module.

12. The modular electronic automobile seat controller assembly of claim 11 wherein:
the first male bus connector extends from the first surface of the main control module and the first opening is formed in the first surface of the first expansion module.

13. The modular electronic automobile seat controller assembly of claim 11 wherein:
the first male bus connector extends from the first surface of the first expansion module and the first opening is formed in the first surface of the main control module.

14. The modular electronic automobile seat controller assembly of claim 11 further comprising:
a third electronic seat device;
a second expansion module comprising: a first surface; and, at least one manually actuated electronic seat control that controls the third electronic seat device;
a second male bus connector having a length L3, wherein L3 is less than L1;
a second opening that defines a second female bus connector that receives the second male bus connector to form an electronic mating connection between the main control module and the second expansion module; and,
wherein one of: (1) the second male bus connector extends from the second surface of the main control module and the second opening is formed in the first surface of the second expansion module; and, (2) the second male bus connector extends from the first surface of the second expansion module and the second opening is formed in the second surface of the main control module.

15. The modular electronic automobile seat controller assembly of claim 14 wherein:

the second male bus connector extends from the second surface of the main control module and the second opening is formed in the first surface of the second expansion module.

16. The modular electronic automobile seat controller assembly of claim 14, further comprising a cap attachable to the first and second openings in place of one of the first male bus and the second male bus.

17. The modular electronic automobile seat controller assembly of claim 14 wherein:
the second male bus connector extends from the first surface of the second expansion module and the second opening is formed in the second surface of the main control module.

18. The modular electronic automobile seat controller assembly of claim 11 wherein the first male bus connector comprises one or more of a data bus line and a power supply bus line.

19. The modular electronic automobile seat controller assembly of claim 11 wherein the first male bus connector comprises one or more of a serial bus, parallel bus, a high performance parallel interface bus, an IEEE-488 bus, a small computer system interface bus, a serial attached small computer interface bus, an RS-232 bus, a universal serial bus, an IEEE 1394 bus.

20. The modular electronic automobile seat controller assembly of claim 11 wherein the main control module controls one or more of vehicle seat fore and aft motion, vehicle seat tilt, and vehicle seat height.

\* \* \* \* \*